United States Patent [19]
Clark

[11] 3,793,989
[45] Feb. 26, 1974

[54] DEODORIZED PET RELIEF STATION

[76] Inventor: Thomas L. Clark, 12444 Wood Manor, Dallas, Tex. 75234

[22] Filed: Jan. 15, 1973

[21] Appl. No.: 323,764

[52] U.S. Cl. .................................... 119/1, 119/19
[51] Int. Cl. ........................................... A01k 29/00
[58] Field of Search .............. 119/19, 1; 239/49, 70

[56] References Cited
UNITED STATES PATENTS

| | | | |
|---|---|---|---|
| 3,428,026 | 2/1969 | Sohmers et al. ...................... | 119/19 |
| 3,487,814 | 1/1970 | Ingebritsen .......................... | 119/19 |
| 3,091,396 | 5/1963 | Curtin................................ | 239/49 X |
| 3,677,441 | 7/1972 | Nixon, Jr. et al. ................. | 239/70 X |
| 3,085,550 | 4/1963 | Crawford............................. | 119/1 |

*Primary Examiner*—Hugh R. Chamblee
*Attorney, Agent, or Firm*—Arthur M. Sloan

[57] ABSTRACT

A pet house including means for distributing deodorizer throughout the pet house and means for retaining the odors and deodorizer smell within the confines of the pet house. An electric powered fan may circulate and distribute deodorizer. Deodorant may be a solid, a semi-solid, or a liquid deodorizer fed through a wick from a container supplied with liquid deodorant, or deodorizer may be automatically dispensed by a timed aerosol dispenser. The top of the pet house which is removeable serves to retain the odors and deodorizer smell within the pet house and to prevent contamination of the ambient atmosphere. Removal of the top of the pet house affords ready access to the interior of the pet house for purposes of cleaning, changing cat litter absorbent material, changing batteries in the deodorizer unit, and adding deodorant. The deodorizer unit is attached to the inside of the pet house.

4 Claims, 3 Drawing Figures

DEODORIZED PET RELIEF STATION

A pet house such as a cat litter house including means for distributing deodorizer throughout the confines of the structure.

Pets, especially cats are frequently kept indoors indefinitely or for protracted periods of time. In the case of cats, although they are readily trained to exercise their natural bodily functions at desired locations such as cat litter boxes containing absorbent cat litter material which is regularly thrown out and replaced, the buildup of odors from the accumulated excrement and urine is frequently overpowering or at least unpleasant for the human occupants of the house. In addition, although the litter box is placed out of the way or in little travelled areas of the house, it is still frequently seen even when not being changed or cleaned, and the resulting sight of the exposed litter box is extremely unpleasant especially when coupled with the odors.

The pet house of the subject invention overcomes the disadvantages of prior art cat litter boxes since the litter is accumulated in a closed receptacle or house having an opening for ready access by the pet and containing a deodorant disposer. The top of the pet house or receptacle is readily removed and replaced affording ready access to the interior of the pet house for purposes of cleaning, changing cat litter absorbent material, changing batteries in the deodorizer dispensing unit, adding deodorant, and all other useful or desirable purposes.

In the case of waste material or cat litter the fact that the house or receptacle is enclosed except for the access opening not only keeps unsightly excrement from human view but also helps to retain the pet and pet waste odors as well as the smell of the deodorant which is dispensed within the house or receptacle.

The deodorizer unit which is attached to the inside of the pet house distributes deodorizer throughout the inside of the pet house. Any suitable type of deodorizer dispenser may be used including a unit with an electric powered fan circulating and distributing deodorizer which is fed through a wick from a container supplied with liquid deodorant or an automatic timed aerosol dispenser such as manufactured by Quipu Corp., an affiliate of Risdon at Pontiac, South Carolina. The deodorizer unit may include an evaporative or easily vaporized solid deodorant such as crystals or a semi-solid deodorant such as a gel, instead of a liquid deodorant or an aerosol vapor.

The bottom of the pet house or receptacle may be furnished with a suitable removable container for holding cat litter absorbent material and waste.

By removing the top of the pet house or receptacle, the deodorizer unit may be easily serviced or replaced.

Therefore, it is an object of the subject invention to provide a pet house which reduces pet odors in the ambient atmosphere.

Another object of the subject invention is to provide a pet house which removes pet waste material from human view.

A further object of the subject invention is to provide a pet house for receiving pet litter and waste and equipped with means for dispensing and circulating deodorizer within the pet house.

Still another object of the subject invention is to provide a pet house providing easy access to pets from which the top may be readily removed for cleaning and servicing.

Yet another object of the subject invention is to provide a pet house which is constructed to receive a pet litter absorbent material container.

Other objects of the invention and the nature thereof will become apparent from the following description considered in conjunction with the accompanying drawings.

For illustrative purposes, the invention will be described in conjunction with the accompanying drawings in which.

Figure 1:
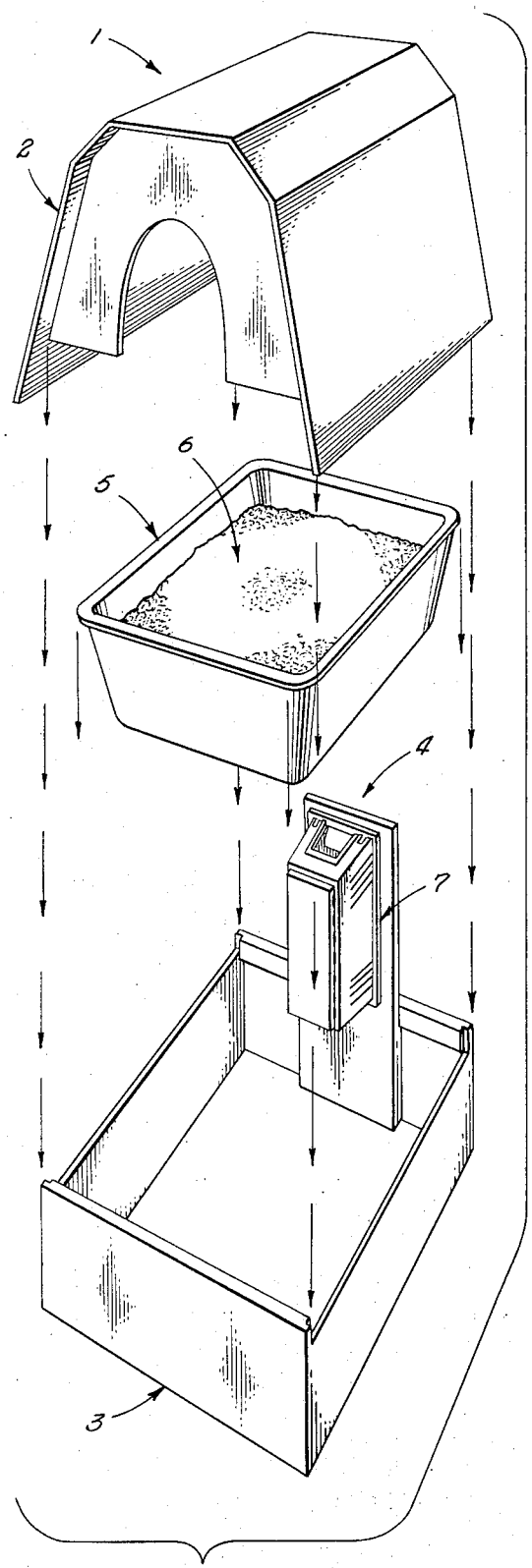
FIG. 1 is an exploded view of a pet house in accordance with the invention.

Turning to the drawings in FIG. 1 the pet house 1 is shown with top section 2 and bottom section 3. The deodorizer unit 4 is shown mounted to the bottom section 3. The pet litter absorbent material container 5 which is optional is shown containing cat litter absorbent material 6.

Figure 2:
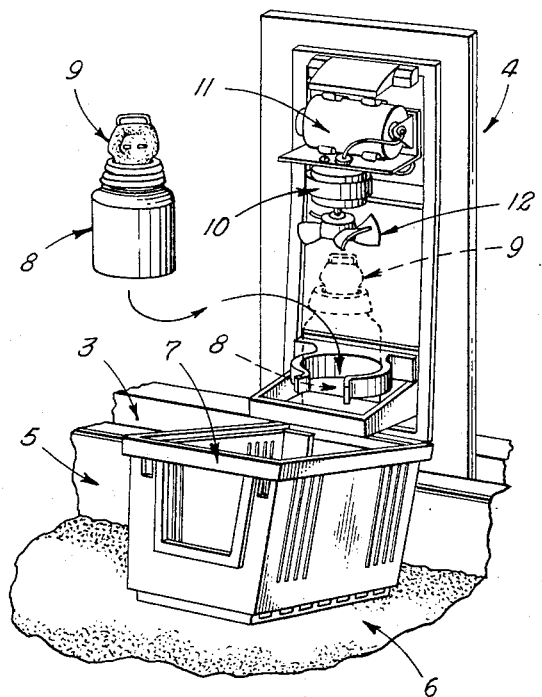
FIG. 2 is an exploded view of one type of deodorizer dispenser which may be used with the subject invention.

In FIG. 2 the deodorizer unit 4 is shown with cover 7, liquid deodorizer container 8, dispensing wick 9, and motor 10, powered by battery 11, and driving fan 12. Although the fan promotes circulation of the deodorant, and increases the effectiveness of the invention, the motor 10, battery 11, and fan 12 may be omitted. An alternating current power source may be used instead of a battery.

The deodorizer unit 4 may contain an evaporative solid or semi-solid, i.e., gel deodorizer in place of liquid deodorizer container 8 or the liquid deodorizer container 8 may contain a solid or semi-solid deodorant instead of a liquid.

Figure 3:
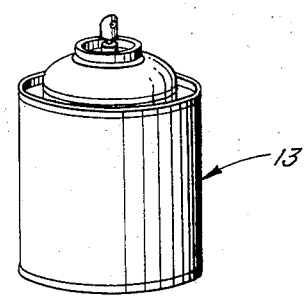
FIG. 3 is a perspective view of an aerosol deodorizer dispenser which may be used with an automatic timed release mechanism in the subject invention.

In FIG. 3 a typical aerosol deodorant dispensing container 13 is shown which may be used in the pet house of the subject invention with a timed automatic release or dispensing mechanism. As noted, one type of timed automatic aerosol dispensing unit which is battery operated and emits a measured finely atomized spray every 15 minutes is manufactured by Quipu Corp., an affiliate or Risdon at Pontiac, South Carolina. It is to be understood, however, that any suitable deodorizer unit for dispensing and circulating deodorizer in the pet house may be used.

As noted, pet litter absorbent material container 5 is optional. If the pet house is to be used for the collection of animal waste material, absorbent material may be placed directly in the bottom section 3 of the pet house.

It can be seen that the present invention has a wide scope of applications and as hereinabove described and in its representative embodiment is merely illustrative and not exhaustive in scope.

Having thus described my invention what I claim as my invention and desire to secure by Letters Patent of the United States is:

1. A pet relief station constructed of opaque material having a removeable top section containing structure defining an opening sufficient for ingress and egress of a pet but effectively restricting the interior from human view, and a bottom section, and including cat litter absorbent material, means for containing the cat litter absorbent material including a removeable receptacle substantially filling the bottom section, a deodorizer, means for dispensing the deodorizer, means for continuously circulating the deodorizer within the pet relief station including a blower fan and means including a motor and a source of power for the motor for continuously driving the fan to circulate the deodorizer within the pet relief station, and support means within the pet relief station to support the means for dispensing the deodorizer and the means for circulating the deodorizer.

2. A pet relief station as described in claim 1 in which the means for dispensing deodorizer includes a liquid deodorizer, a deodorizer container, and a wick for removing deodorizer from the deodorizer container for circulation by the fan within the pet relief station.

3. A pet relief station as described in claim 1 in which the deodorizer is a solid.

4. A pet relief station as described in claim 1 in which the deodorizer is a semi-solid.

* * * * *